Figure 1:
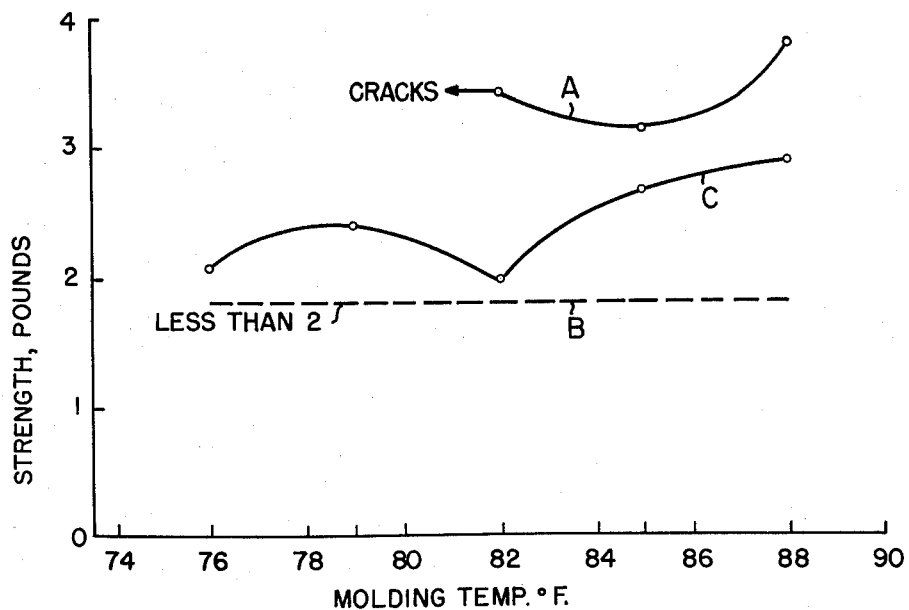

March 12, 1963  E. P. CASHMAN ET AL  3,081,187
COMPOSITION FOR SUPERIOR MOLDING WAX
Filed May 24, 1960  2 Sheets-Sheet 1

Edward P. Cashman
Theodore A. White   Inventors
Harry M. Farnham, Jr.

By Richard N. Nagel

Patent Attorney

March 12, 1963    E. P. CASHMAN ET AL    3,081,187
COMPOSITION FOR SUPERIOR MOLDING WAX
Filed May 24, 1960    2 Sheets-Sheet 2

Edward P. Cashman
Theodore A. White     Inventors
Harry M. Farnham, Jr.

By Richard N. Nagel

Patent Attorney

COMPOSITION FOR SUPERIOR MOLDING WAX

Edward P. Cashman, Bayonne, Theodore A. White, New Providence, and Harry M. Farnham, Jr., Clark, N.J., assignors to Esso Research and Engineering Company, a corporation of Delaware
Filed May 24, 1960, Ser. No. 31,419
3 Claims. (Cl. 106—270)

This invention relates to a novel and improved wax composition and an improved process for its manufacture. More specifically, this invention is concerned with a wax composition which exhibits high strength characteristics when molded within comparatively wide variations in molding temperatures.

Petroleum wax is used for the manufacture of a variety of articles wherein they are molded to a particular configuration. Examples of molded wax objects include candles and novelty items.

In the production of wax objects of high strength, it has been found that if the molding temperature is not carefully defined within a narrow range, the articles produced are of substandard strength, unsuitable for their intended use. This factor has hitherto presented a major problem in the manufacture of high strength moldled wax articles in large-scale commercial equipment wherein precise temperature control is difficult and expensive. On the other hand, the insensitivity of the wax composition to molding temperature change permits the manufacturer to allow cooling water temperature to vary without making objects of poor strength.

It is, therefore, an object of this invention to define a wax composition which may be molded into a product exhibiting high strength though molded over a wide range of molding temperatures.

Another object of this invention is to describe a wax which is more valuable for commercial molding applications because of its superior strength characteristics.

A wide variety of petroleum waxes is known and has been used in the laboratory and commercially. Broadly, there are two principal categories: paraffin and amorphous. Neither is capable of precise definition. However, it is generally considered that paraffin waxes include all of the waxy components in low viscosity oil which could be processed by old pressing and sweating techniques. This limits the paraffin wax boiling range to about 670 to 900° F. at atmospheric pressure.

There are three important classes of paraffin wax depending on the degree of refinement. These are: (a) refined wax (less than 0.5% oil), (b) scale wax (about 1.3% oil), and (c) slack wax (3 to 40% oil).

Amorphous waxes include the high boiling distillate and residual waxes and are divided into two classes: (a) petrolatums and (b) microcrystalline waxes. Petrolatums are characterized by relatively high oil contents (5 to 40%) with some medicinal grades being highly refined with respect to color, odor, and purity. Microcrystalline waxes vary from 0.5 to 7% oil depending on the properties required. All the above wax classes are split into further grades, reflecting the particular use requirements.

In accordance with this invention, it has been found that by carefully controlling the wax composition a blend can be prepared which is not sensitive to molding temperature and produces molded articles of especially high strength.

Most significant in the wax compositions described herein is the melting point distribution. The wax of this invention must meet the following criteria:

Firstly, its English melting point must be in the range of 146 to 150° F. EMP, preferably from 147½ to 148½° F. EMP.

Secondly, the 0 to 5% cut range, i.e. the initial 5% overhead of the whole wax must have an average melting point in excess of about 130° F. EMP.

Thirdly, the 95 to 100% cut range (the bottoms) of the whole wax must be crystalline and have an average melting point above about 160° F. EMP.

It has further been found that an even higher strength wax composition can be obtained if the 90 to 95% cut range of the whole wax has an average melting point below 160° F. EMP. Such a wax is a preferred embodiment of this invention and, in addition, is not sensitive to variations in molding temperatures. Ths wax, of course, must also conform to the melting point characteristics set out in the previous paragraphs.

It should be noted that in order to obtain the requisite strength, the oil content of the improved wax composition must be less than 0.5 wt. percent, preferably less than 0.3 wt. percent. Such a composition meets the standards of a refined wax. Hence, the improved results of the instant invention cannot be obtained by blending waxes of relatively high oil content such as slack wax or petrolatum wax.

Petrolatum waxes which satisfy these requirements have been found to have high strength characteristics over a comparatively wide range of molding temperatures.

Figure 2:
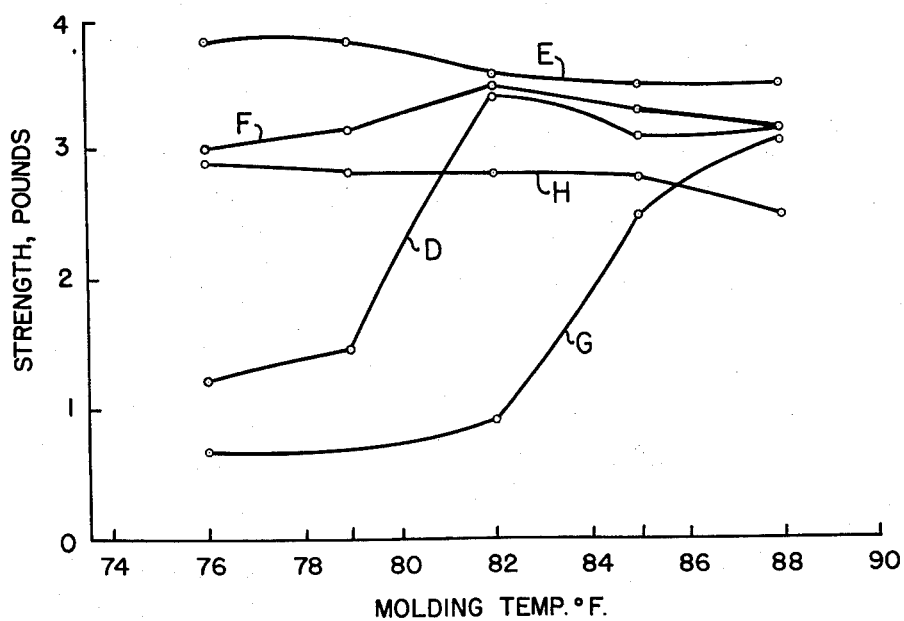

FIGURES 1 and 2 relate the strength of various wax compositions produced over a range of molding temperatures.

The strength of molded wax articles was measured by forming wax rods about 4" in length and 5/16" in diameter. This was accomplished by heating the various wax compositions to 175° F. and pouring them into molds which were at room temperature. The material was held at room temperature for 30 seconds and thence placed in a water bath at the desired temperature for 15 minutes. The molds were then removed from the water bath, and the wax objects removed therefrom. Water bath temperatures in the range of 76 to 88° F. were used in order to predict commercial operation.

The molds consisted of two sections, a bottom section 3½" high having a 5/16" inside diameter and a 10/16" outside diameter; and a top section 2" high having a 9/16" inside diameter and a 10/16" outside diameter. The two sections are overlapped so that the top section can fit over ¼" of the bottom section.

A large variety of additives may be added to the wax composition of this invention. For example, stearic acid is often added to aid in mold release and appearance of the finished product. A wide variety of dyes and pigments may also be added to enhance the decorative effect of the molded article.

To further illustrate the improved wax composition of the invention the following examples are given.

EXAMPLE 1

Three samples of conventional waxes were tested for strength and molding sensitivity. Samples A and B were obtained from San Joaquin (Venezuela) crude oil by solvent extraction with methylethylketone and toluol, distillation, hydrofining and bauxite percolation. Sample C was obtained from a Louisiana-Mississippi crude by solvent extraction and distillation. All of the above waxes are predominantly normal paraffins having minor amount of iso- and cyclic paraffins. The following table gives the physical inspections of these three waxes. The various melting point cuts were obtained by vacuum distillation at 1 mm. Hg.

*Table I*

| Physical Inspections | Sample A | Sample B | Sample C |
|---|---|---|---|
| EMP, ° F. | 143 | 151 | 154 |
| Vis., cs., at 210° F. | 4.3 | 5.3 | 6.0 |
| Blocking, ° F. | 117 | 127 | 130 |
| Melting Point Distribution Cut Range, Percent: | Average EMP of Cut | | |
| 0–5 | 131 | 144 | 132 |
| 5–10 | | 156 | 139 |
| 85–90 | | 155½ | 162½ |
| 90–95 | 154 | 156 | 163½ |
| 95–100 | 155 | 156 | 168 |

Strength tests were performed at various molding temperatures in the manner described above. The following data were obtained. These data are represented graphically in FIGURE 1.

*Table II*

| Strength, lbs.,[1] at Molding Temp., ° F. | Sample A | Sample B | Sample C |
|---|---|---|---|
| 76 | Cracks [1] | <2.0 | 2.1 |
| 79 | Cracks [2] | <2.0 | 2.3 |
| 82 | 3.5 | <2.0 | 2.0 |
| 85 | 3.3 | <2.0 | 2.7 |
| 88 | 3.7 | <2.0 | 2.9 |

[1] Wax blended with 30% stearic acid before moulding and testing specimen.
[2] Specimen has structural cracks which make object very weak at point of cracks.

It will be noted that the above three waxes, all commercially available compositions, are unsatisfactory when high strength coupled with low molding temperature sensitivity is desirable. The composition A shows a high strength at high molding temperatures but is completely unsatisfactory at the lower temperatures. The wax C possesses both high sensitivity and mediocre strength characteristics. The composition B, while not particularly sensitive, is of poor strength.

It should be noted that the EMP of the whole wax composition for each of the three samples is outside of the 146 to 150 range preferred. In addition, samples A and B fail to have 95 to 100% cut range melting points which average over 160.

EXAMPLE 2

Blends of the above three wax samples were made in order to show the improved results obtained by using the wax of the instant invention. A commercial wax used extensively for molding wax objects was also tested. The following table shows the composition of the various blends and their physical characteristics.

*Table III*

WAX BLENDS FOR MOLDED OBJECTS

| Sample No. | D | E | F | G | H |
|---|---|---|---|---|---|
| Composition: | | | | | |
| A | 30 | 35 | 43 | 35 | Commercial Wax. |
| B | 60 | 45 | | 65 | |
| C | 10 | 20 | 57 | | |
| | Average EMP of Cut | | | | |
| Melting Point Distribution: | | | | | |
| EMP, ° F | 148 | 148 | 148 | 148 | 147½ |
| 0–5 | 131 | 131 | 131 | 131 | 127 |
| 5–10 | 138 | 138 | 138 | 138 | 134 |
| 85–90 | 155 | 156 | 160 | 155½ | 160 |
| 90–95 | 156 | 157 | 162 | 156 | 162 |
| 95–100 | 159 | 160¼ | 165 | 156 | 167 |
| 10 mm. Dist., percent Distilled: | | | | | |
| 5 | 514 | 508 | 506 | 523 | 504 |
| 10 | 522 | 518 | 522 | 529 | 512 |
| 50 | 552 | 554 | 562 | 552 | 562 |
| 90 | 590 | 594 | 83% @620 | 577 | 620 |
| 95 | 601 | 608 | | 597 | |
| FBP | 620 | 97% @620 | | 620 | |

The strength of these waxes was tested in the manner described. The following results were obtained. These data are presented graphically in FIGURE 2.

*Table IV*

| Sample No. | D | E | F | G | H |
|---|---|---|---|---|---|
| Strength, lbs.,[1] at Molding Temp., ° F.: | | | | | |
| 76 | 1.3 | 3.8 | 3.0 | <1 | 2.9 |
| 79 | 1.5 | 3.8 | 3.2 | <1 | 2.8 |
| 82 | 3.4 | 3.6 | 3.5 | <1 | 2.8 |
| 85 | 3.1 | 3.5 | 3.3 | 2.5 | 2.7 |
| 88 | 3.2 | 3.5 | 3.2 | 3.1 | 2.5 |

[1] Wax blended with 30% stearic acid before moulding and testing specimen.

The above data clearly show the advantage of the instant invention. Samples E and F are the only compositions which are within the defined range of the instant invention. These samples have consistently high strength over the indicated molding temperature range. Sample E had a consistent strength throughout the molding temperature range and is stronger. It is, therefore, preferred. Samples D and G had a high strength at higher molding temperatures, but had very poor strength at lower molding temperatures. Commercial sample H, though not highly sensitive to molding temperatures, has a considerably lower strength than the wax of the instant invention.

An inspection of the data shows that of these five samples only samples E and F meet the melting point characteristics defined by this invention. Waxes D and G fail to have a 95 to 100% cut range with an average melting point in excess of 160° F. The first 5% cut range of wax H differs from the waxes of this invention in that its average melting point is not greater than 130° F. It should be further noted that wax E is preferred over wax F since it has an average melting point for the 90 to 95% cut range of less than 160.

EXAMPLE 3

Experiments were performed with a wax in which the final 5% melting was below 160 EMP and with a second wax the same as the first to which 5% of a microcrystalline wax melting above 160 was added. In the case of the first sample, the strength was 2.9 pounds when molded at 85° F. While this is fairly good, the strength at lower molding temperatures is quite poor. The second sample, on the other hand, had a poor strength, e.g. 2 pounds at 85° F. molding temperature. These experiments show that waxes (1) having their last 5% cut range melting below 160° F. EMP, or (2) having a 5% cut range composed of microcrystalline wax are unsatisfactory because of their poor molding strength and/or their temperature susceptibility.

The above examples are merely illustrative of the instant invention and should not be taken as definitive of the scope thereof.

What is claimed is:

1. An improved wax with superior strength and molding properties which consists essentially of a blend of petroleum waxes, said blend having a melting point in the range of from 146 to 150° F. EMP, a 0 to 5% distillation cut range with an average melting point of at least 130° F. EMP, a 95 to 100% distillation cut range with an average melting point above 160° F. EMP, and an oil content of less than 0.5 wt.%, said 95 to 100% cut range consisting wholly of crystalline wax.

2. A wax as described in claim 1 wherein the English melting point is between 147½ and 148½° F.

3. A wax of claim 1 wherein the 90 to 95% cut range has an average melting point below 160° F. EMP when subject to a 1 mm. vacuum distillation.

References Cited in the file of this patent

UNITED STATES PATENTS 2,755,193     Rumberger _____ July 17, 1956

OTHER REFERENCES

Warth: Chemistry and Technology of Waxes, 2nd ed., Reinhold Publishing Corporation, N.Y., 1956, pages 404 and 859–60.